US008577417B2

(12) United States Patent
Lessing

(10) Patent No.: US 8,577,417 B2
(45) Date of Patent: Nov. 5, 2013

(54) METHODS, DEVICES, AND COMPUTER PROGRAM PRODUCTS FOR LIMITING SEARCH SCOPE BASED ON NAVIGATION OF A MENU SCREEN

(75) Inventor: Simon Lessing, Malmo (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1280 days.

(21) Appl. No.: 11/768,459

(22) Filed: Jun. 26, 2007

(65) Prior Publication Data
US 2009/0005123 A1 Jan. 1, 2009

(51) Int. Cl.
*H04B 1/38* (2006.01)
*G06F 15/16* (2006.01)
*G06F 3/048* (2013.01)

(52) U.S. Cl.
USPC ............................ 455/566; 709/205; 715/764

(58) Field of Classification Search
USPC ........................................................ 455/566
See application file for complete search history.

(56) References Cited

U.S. PATENT DOCUMENTS

| 6,839,702 | B1 * | 1/2005 | Patel et al. ............................ 1/1 |
| 7,113,941 | B2 * | 9/2006 | Arend et al. .......................... 1/1 |
| 2002/0178223 | A1 * | 11/2002 | Bushkin ....................... 709/205 |
| 2003/0236778 | A1 * | 12/2003 | Masumoto et al. ............... 707/3 |
| 2004/0143569 | A1 * | 7/2004 | Gross et al. ....................... 707/3 |
| 2006/0101347 | A1 * | 5/2006 | Runov et al. ................... 715/764 |
| 2006/0190441 | A1 * | 8/2006 | Gross et al. ....................... 707/3 |
| 2007/0016570 | A1 | 1/2007 | Punaganti Venkata et al. |
| 2007/0033172 | A1 * | 2/2007 | Williams et al. .................. 707/3 |

FOREIGN PATENT DOCUMENTS

WO WO 2004/023243 A2 3/2004

OTHER PUBLICATIONS

"Copernic Desktop Search—Screenshots", http://web.archive.org/web/20070104184054/http://www.copernic.com/en/products/desktop-search/screenshots.html (2007).
Notification of Transmittal of the International Search Report and The Written Opinion of the International Searching Authority, or The Declaration corresponding to International Application No. PCT/EP2007/063210 mailed May 16, 2008.

* cited by examiner

*Primary Examiner* — Timothy Pham
(74) *Attorney, Agent, or Firm* — Myers Bigel Sibley & Sajovec, P.A.

(57) ABSTRACT

A method of operating an electronic device includes displaying a search field in a menu screen including a plurality of icons representing respective application programs. Selection of at least one of the plurality of icons is visually indicated responsive to navigation of the menu screen. A search scope is limited to at least one database associated with at least one application program represented by the selected at least one of the plurality of icons. The at least one database is searched using the limited search scope responsive to entry of a search string including one or more alphanumeric characters in the search field. If found in the at least one database, at least one search result including the search string is displayed. Related devices and computer program products are also discussed.

20 Claims, 6 Drawing Sheets

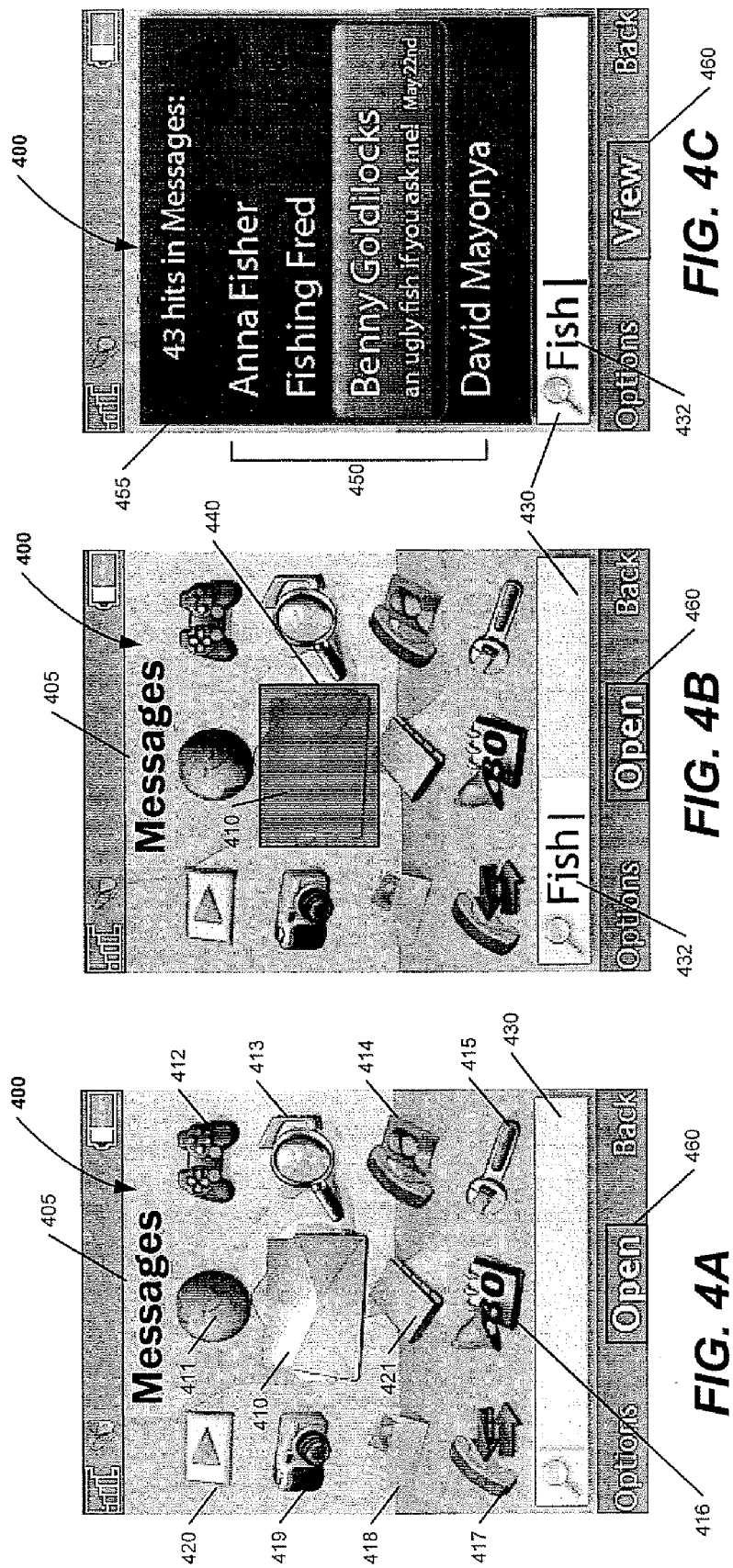

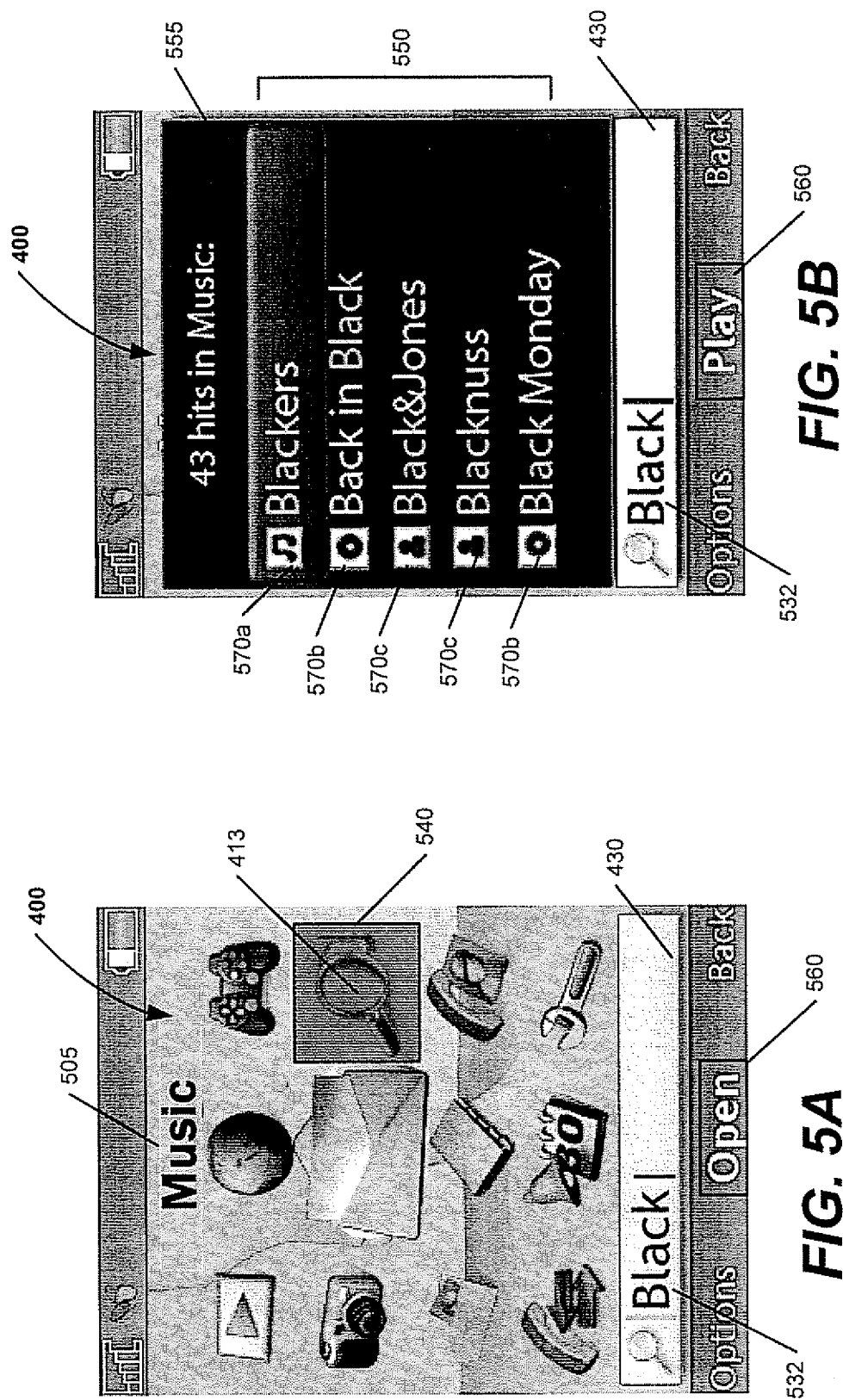

METHODS, DEVICES, AND COMPUTER PROGRAM PRODUCTS FOR LIMITING SEARCH SCOPE BASED ON NAVIGATION OF A MENU SCREEN

FIELD OF THE INVENTION

The present invention relates to electronic devices, and, more particularly, to search functionality in electronic devices.

BACKGROUND OF THE INVENTION

Electronic devices, such as personal computers and mobile terminals, increasingly provide a variety of communications, multimedia, and/or data processing capabilities. For example, mobile terminals, such as cellphones, personal digital assistants, and/or laptop computers, may provide storage and access to data in a wide variety of multimedia formats, including text, pictures, music, and/or video.

Storage capacity in electronic devices may increase exponentially in the next several years. For example, it is believed that storage capacity may double at a higher rate than processor speed and/or transmission bandwidth. As such, electronic devices and may store gigabytes and even terabytes of data in the near future.

Due to the increasing storage capacity provided by electronic devices, search functionality may become increasingly important in managing larger amounts of data. In conventional electronic devices, users may search for data by entering a string of alphanumeric characters in a search field, and/or by navigating to the location or 'folder' in which the data is stored via a menu system. For example, mobile terminals, such as mobile phones, may offer a search field within particular applications (for instance, searching for particular messages within a messaging application, searching for particular names within a contacts application, etc.). In addition, Zi Corporation's Qix™ is a search and discovery engine for mobile phones that provides a search interface from the standby screen of a mobile phone. Also, personal computers may offer both search and navigation functions to aid users in finding desired data stored in memory devices associated with the computer.

SUMMARY OF THE INVENTION

According to some embodiments of the present invention, methods of operating electronic devices include displaying a search field in a menu screen including a plurality of icons representing respective application programs. Selection of at least one of the plurality of icons is visually indicated responsive to navigation of the menu screen. A search scope is limited to at least one database associated with at least one application program represented by the selected at least one of the plurality of icons. The at least one database is searched using the limited search scope responsive to entry of a search string including one or more alphanumeric characters in the search field. If found in the at least one database, at least one search result including the search string is displayed.

In some embodiments, the least one database is searched prior to executing the application program represented by the selected one of the plurality of icons.

In other embodiments, the menu screen may be a main menu and/or a standby menu screen in a mobile terminal. In some embodiments, the at least one search result may be displayed in the menu screen. In other embodiments, the least one search result may be displayed after executing the application program represented by the selected one of the plurality of icons.

In some embodiments, at least one sub-database accessible by the database may be searched using the limited search scope.

In other embodiments, the search result may be displayed along with an icon associated with the database in which the search result was found. For example, in some embodiments, the icon may be a pictorial representation of a functionality of the application program associated with the database. In other embodiments, the icon may be a pictorial representation of a category associated with the search result.

In some embodiments, a plurality of search results including the search string may be displayed in an order that is based on the at least one database in which the plurality of search results were found and/or the at least one application program represented by the selected at least one of the plurality of icons. In other embodiments, a plurality of search results from a plurality of databases may be displayed in an order such that ones of the plurality of search results found in a same one of the plurality of databases are grouped together.

According to further embodiments of the present invention, an electronic device includes a user interface, a memory, a display, and a search module. The user interface is configured to provide navigation of a menu screen. The memory is configured to store application programs and databases associated therewith. The display is configured to display a search field in the menu screen. The menu screen also includes a plurality of icons representing the respective application programs. The display is further configured to visually indicate selection of at least one of the plurality of icons response to navigation of the menu screen via the user interface. The search module is configured to limit a search scope to at least one database associated with at least one application program represented by the selected at least one of the plurality of icons. The search module is further configured to search the least one database using the limited search scope responsive to entry of a search string including one or more alphanumeric characters in the search field. The display is further configured to display the at least one search result including the search string if found in the least one database.

In some embodiments, the device may further include a processor that is configured to execute the application program represented by the selected one of the plurality of icons. The search module may be configured to search the least one database prior to execution of the application program by the processor.

In other embodiments, the menu screen may be a main menu and/or a standby menu screen in a mobile terminal. In some embodiments, the display may be configured to display the at least one search result in the menu screen. In other embodiments, the display may be configured to display the at least one search result after execution of the application program represented by the selected one of the plurality of icons.

In some embodiments, the display may be configured to display the search result along with an icon associated with the database in which the search result was found. For example, in some embodiments, the icon may be a pictorial representation of a functionality of the application program associated with the database. In other embodiments, the icon may be a pictorial representation of a category associated with the search result.

In some embodiments, the display may be configured to display a plurality of search results including the search string in an order that is based on the at least one database in which the plurality of search results were found and/or the at least one application program represented by the selected at least one of the plurality of icons. In other embodiments, the display may be configured to display a plurality of search results from a plurality of databases in an order such that ones of the plurality of search results found in a same one of the plurality of databases are grouped together.

Although described above primarily with respect to method and electronic device aspects of the present invention, it will be understood that the present invention may be embodied as methods, electronic devices, and/or computer program products.

BRIEF DESCRIPTION OF THE DRAWINGS

FIGS. 4A-4C are example screenshots illustrating operations for limiting search scope based on navigation of a main menu screen in a mobile terminal in accordance with some embodiments of the present invention.

FIGS. 5A-5B are example screenshots illustrating operations for limiting search scope based on navigation of a main menu screen in a mobile terminal in accordance with other embodiments of the present invention.

DETAILED DESCRIPTION OF EMBODIMENTS OF THE INVENTION

Figure 1:
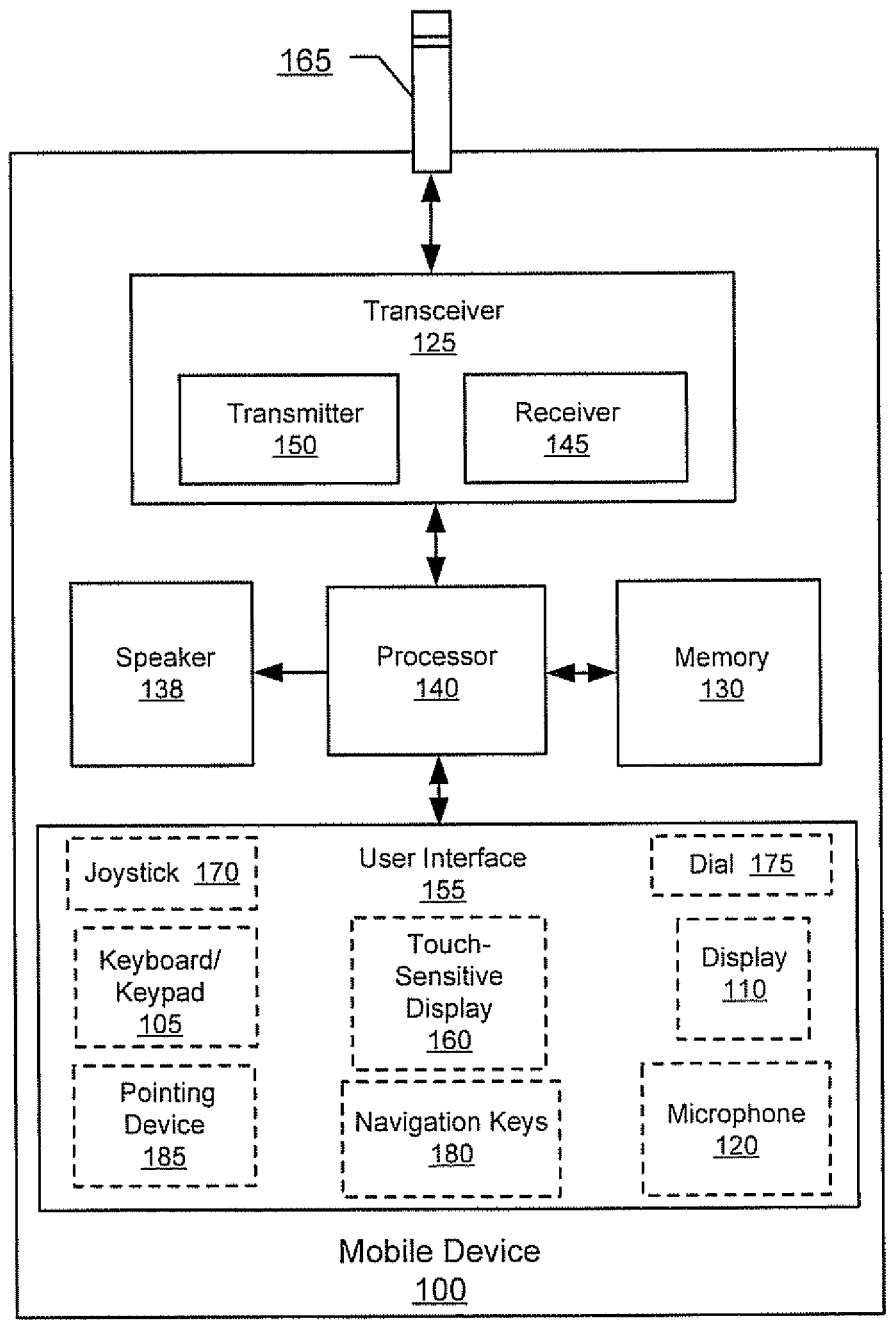
FIG. 1 is a block diagram illustrating a mobile terminal in accordance with some embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. In contrast, when an element is referred to as being "directly coupled" or "directly connected" to another element, there are no intervening elements present. Furthermore, "connected" or "coupled" as used herein may include wirelessly connected or coupled. As used herein, the term "and/or" includes any and all combinations of one or more of the associated listed items, and may be abbreviated as "/".

It will also be understood that, although the terms first, second, etc. may be used herein to describe various elements, these elements should not be limited by these terms. These terms are only used to distinguish one element from another. For example, a first multimedia device could be termed a second multimedia device, and, similarly, a second multimedia device could be termed a first multimedia device without departing from the teachings of the disclosure.

As will be appreciated by one of skill in the art, the present invention may be embodied as methods, devices, and/or computer program products. Accordingly, the present invention may be embodied in hardware and/or in software (including firmware, resident software, micro-code, etc.). Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package. The program code may execute entirely on an electronic device or only partly on the electronic device and partly on another device. In the latter scenario, the other device may be connected to the electronic device through a wired and/or wireless local area network (LAN) and/or wide area network (WAN), or the connection may be made to an external computer (for example, through the Internet using an Internet Service Provider).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

For purposes of illustration, embodiments of the present invention are described herein in the context of a mobile terminal. It will be understood, however, that the present invention is not limited to such embodiments, and may be embodied generally as any electronic device that provides search functionality as described herein.

Some embodiments of the present invention may arise from realization that conventional search functionality in electronic devices may lack intuitive sorting and/or filtering capabilities, and as such, relatively large amounts of search results (or "hits") may be found when searching, which may limit the usefulness of the search. Accordingly, some embodiments of the present invention may use navigation of a menu screen to narrow or limit a scope of the search. For example, in a mobile phone, a user may highlight or otherwise visually indicate selection of an icon that represents a particular application on a main menu screen or active standby screen, and a search scope may be limited to one or more databases associated with the particular application represented by the highlighted icon. In addition, the search results may be displayed on the main menu/standby screen of the mobile phone prior to and/or without executing the application represented by the highlighted icon. Accordingly, the scope of a search may be narrowed in a more natural and/or intuitive manner based on navigation of a menu screen.

FIG. 1 is a block diagram illustrating a mobile terminal in accordance with some embodiments of the present invention. Referring now to FIG. 1, an exemplary mobile terminal 100 includes a transceiver 125, memory 130, a speaker 135, a processor 140, and a user interface 155. The transceiver 125 typically includes a transmitter circuit 150 and a receiver circuit 145 which cooperate to transmit and receive radio frequency signals to and from base station transceivers via an antenna 165. The radio frequency signals transmitted between the mobile terminal 100 and the base station transceivers may include both traffic and control signals (e.g., paging signals/messages for incoming calls), which are used to establish and maintain communication with another party or destination. The radio frequency signals may also include packet data information, such as, for example, cellular digital packet data (CDPD) information. In addition, the transceiver 125 may include an infrared (IR) transceiver configured to transmit/receive infrared signals to/from other electronic devices via an IR port. The memory 130 may represent a hierarchy of memory that may include volatile and/or non-volatile memory, such as removable flash, magnetic, and/or optical rewritable non-volatile memory. The processor 140 is coupled to the transceiver 125, the memory 130, the speaker 135, and the user interface 155. The processor 140 may be, for example, a commercially available or custom microprocessor that is configured to coordinate and manage operations of the transceiver 125, the memory 130, the speaker 135, and/or the user interface 155.

As noted above, the mobile terminal 100 may further include a user interface 155 coupled to the processor 140. The user interface 155 may include a microphone 120, a display 110 (such as a liquid crystal display), a joystick 170, a keyboard/keypad 105, a touch sensitive display 160, a dial 175, a directional key(s) 180, and/or a pointing device 185 (such as a mouse, trackball, touch pad, etc.). For example, the keyboard/keypad 105 may be operable to define alphanumeric characters/symbols on the display 110. However, depending on functionalities offered by the mobile terminal 100, additional and/or fewer elements of the user interface 155 may actually be provided. For instance, the touch sensitive display 160 may functionally replace a display 110, a keypad 105, and/or a pointing device 185. The touch sensitive display 160 may display a plurality of virtual command and/or control buttons. The command/control buttons may be selected by touching a stylus on the touch sensitive display 160 at the appropriate location(s) of the virtual buttons shown on the touch sensitive display 160, for example, to select and/or launch an application via a displayed menu screen. The foregoing components of the mobile terminal 100 may be included in many conventional mobile terminals and their functionality is generally known to those skilled in the art. As will be explained in detail below, the processor 140 and the memory 130 are configured in accordance with at least one embodiment described herein.

Figure 2:
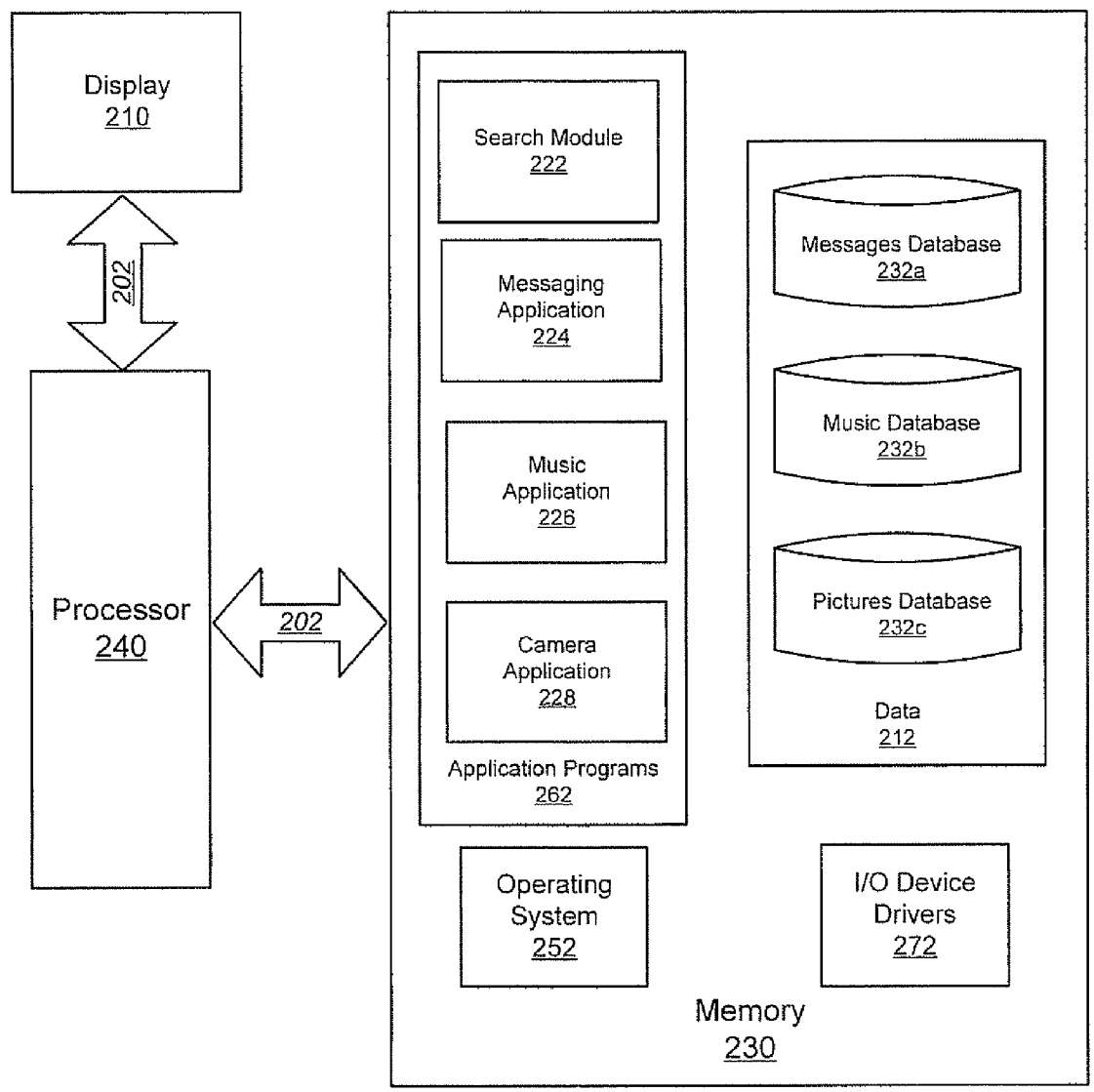
FIG. 2 is a block diagram illustrating a hardware/software architecture for limiting search scope based on navigation a menu screen in accordance with some embodiments of the present invention.

FIG. 2 illustrates a hardware/software architecture including a display 210, a memory device 230, and a processor 240 that may be used to provide navigation-assisted search functionality in a mobile terminal according to some embodiments of the present invention, such as the mobile terminal 100 of FIG. 1. In some embodiments, the processor 240, memory 230, and display 210 may respectively correspond to the processor 140, memory 130, and display 110 of the mobile terminal 100 of FIG. 1.

Referring now to FIG. 2, the processor 240 is configured to communicate with the memory 230 and the display 210 via a data bus 202. The display 210 may be configured to display data that is provided via the processor 240. The memory 230 may be configured to store several categories of software, such as an operating system 252, applications programs 262, and input/output (I/O) device drivers 272. The operating system 252 controls the management and/or operation of system resources and may coordinate execution of programs by the processor 240. The I/O device drivers 272 typically include software routines accessed through the operating system 252 by the application programs 262 to communicate with input/output devices, such as those included in the user interface 155 of FIG. 1, and/or other components of the memory 230. The memory 230 further includes data 212 for the application programs 262 including a plurality of databases 232a-232c.

The application programs 262 are illustrative of programs that implement various features according to embodiments of the present invention, and preferably include at least one application which supports operations for providing a search function. More particularly, the application programs 262 may include a messaging application 224 (such as an e-mail and/or text messaging application), a music application 226 (such as a media player and/or MP3 file player application), a camera application 228, and a search module 222. For example, in some embodiments, the search module 222 may include an application programming interface (API) that supports requests for search functions from one or more of the application programs 262. In other embodiments, the application programs 262 may each include separate search functionality, which may be collectively represented by the search module 222.

The data 212 stored in the memory 230 may include various databases that may be associated with the application programs 262. The databases may include files, names, contacts, e-mails, text messages, and/or other data that may be stored in the memory 230 and accessed by the application programs 262. More particularly, the data 212 may include a messages database 232a, a music database 232b, and a pictures database 232c. For example, the messages database 232a may store e-mail, text messages, and/or other messaging-related data associated with and/or viewable using the messaging application 224. Likewise, the music database 232b may store music files and/or other music-related data (such as digital rights management data) associated with and/or playable via the music application 226, and the pictures database 232c may store image files and/or other image-related data associated with and/or captured via the camera application 228. In addition, a database may be associated with multiple application programs. For example, the pictures database 232c may store image files that are viewable by both the camera application 419 as well as an image viewer application (not shown).

The databases and 232a, 232b, and/or 232c may also include one or more sub-databases. For example, the messages database 232a may include a text messages sub-database and an e-mail messages sub-database. In other embodiments, however, the databases 232a, 232b, and/or 232c themselves may be sub-databases that are accessible by a single database stored in the memory 230. The databases 232a-232c may be internally stored in the memory 230 of the electronic device; however, the databases 232a-232c may not be necessarily stored in the same physical memory unit. For example, the messages database 232a may be stored in a non-removable memory of a mobile terminal, while the music database 232b may be stored in a removable memory device associated with the mobile terminal, such as a memory card.

Accordingly, in some embodiments of the present invention, the display 210 is configured to display a menu screen including a plurality of icons (further illustrated in FIGS. 4A-6B) representing respective ones of the application programs 262. For example, in a mobile phone, the menu screen may be a main menu and/or a standby menu screen from which the application programs 262 may be accessed and/or from which phone numbers may be dialed. Alternatively, in a personal computer, the menu screen may be a start screen and/or start menu for a particular operating system. The display 210 is also configured to visually indicate selection of one or more of the icons on the menu screen responsive to navigation of the menu screen by a user via the user interface (for example, based on movement of an on-screen cursor via the navigation keys 180 of FIG. 1). As used herein, an "icon" may refer to a graphical and/or textual representation of an application program which may be displayed via the display 210. For instance, the display 210 may be configured to visually indicate selection of one or more graphical icons by highlighting, underlining, and/or darkening the icon(s) responsive to navigation of the menu screen. Also, the display 210 may be configured to visually enclose one or more icons within an object, such as an ellipse, rectangle, triangle, and/or other polygon responsive to navigation of the menu screen.

In addition, the display 210 is configured to display a search field in the menu screen along with the icons representing the application programs 262. The search field is associated with the search module 222, and is configured to accept a search string including one or more alphanumeric characters. In some embodiments, the display 210 may display the search field as a permanent part of the menu screen, for example, along a lower portion of the menu screen so as not to interfere with the icons representing the application programs 262. Alternatively, the display 210 may display the search field responsive to user input via the user interface after highlighting one or more of the icons. For example, in a personal computer, the display 210 may highlight one or more graphical icons responsive to depressing or "clicking" a left mouse button, and may display the search field responsive to clicking a right mouse button while the icon is highlighted. Likewise, in a mobile phone, the display 210 may highlight one or more graphical icons responsive to selection thereof via the navigation keys, and may display the search field responsive to depression of a particular button on the keypad while the icon is highlighted. The display 210 may also display the search field on top of and/or at least partially overlapping one or more of the icons responsive to the user input via the user interface.

Still referring to FIG. 2, the search module 222 is configured to query one or more of the databases 232a-232c in the memory 230 to provide a search function. More particularly, responsive to entry of the search string in the search field, the search module 222 is configured to search the databases 232a-232c and identify data that includes the search string. The search string may define words, numbers, proper names, places/locations, and/or portions thereof that may be associated with the data that the user desires to find in the databases 232a-232c. As such, the search string may be used to limit the number of search results or "hits" provided by the search module 222.

In addition, the search module 222 is configured to limit the scope of the search to one or more of the databases 232a-232c based on their association with one or more of the application programs 262. More particularly, the search module 222 is configured to limit the search scope to the database(s) associated with the application program(s) represented by a selected icon(s), as visually indicated by the display 210. For example, when a camera icon representing the camera application 228 is highlighted in the main menu screen of a mobile phone responsive to navigation of the menu screen and a search string is entered in the search field, the search module 222 may limit the scope of the search to the pictures database 232c. In other words, the search module may only identify data in the pictures database 232c that includes the search string. However, the search module 222 may also search one or more sub-databases that may be accessible by the database associated with the highlighted application program using the limited search scope. For instance, responsive to entry of the alphanumeric characters in the search field when an envelope icon representing the messaging application 224 is highlighted, the search module 222 may query the messages database 232a along with e-mail and/or text message sub-databases of the messages database 232a to identify data including the entered search string. In addition, the search module 222 may be configured to search highlighted ones of the sub-databases. For example, responsive to highlighting the graphical icon representing the messaging application 224 in a main menu, the display 210 may present a list of three textual icons, such as 'SMS', 'MMS' and 'E-mail'. The search module 222 may be configured to search a sub-database associated with one or more of the textual icons responsive to highlighting one or more of the textual icons. Thus, the search module 222 may be configured to search one or more databases associated with an application program represented by a highlighted icon prior and/or without executing the application program. Accordingly, the search module 222 may be configured to narrow the search scope to one or more of the databases 232a-232c responsive to navigation of the menu screen via the user interface.

The search module 222 may return a list of data including the entered search string as search results if such data is found in the database(s) that were searched using the limited search scope. The search module 222 may provide the search results, if any, to the display 210 via the processor 240. The display 210 is configured to display at least one search result returned by the search module 222. For example, the display 210 may be configured to display the search result(s) in the menu screen itself on top and/or partially overlapping the displayed icons. Thus, the search result(s) from a particular one of the databases 232a-232c may be displayed without executing the associated application program. Alternatively, the display 210 may be configured to display the search result(s) in a subsequent screen after execution of the application program by the processor 240. The display 210 may also be configured to display the search results along with a graphical and/or textual icon representing the database in which the search result was found. The icon may be displayed adjacent to the search result, such as immediately preceding and/or following the displayed search result. In some embodiments, the icon may be a pictorial representation of a functionality of the application program associated with the database. For example, search results found in the messages database 232a may be displayed along with an 'envelope' icon, while search results found in the music database 232b may be displayed along with a 'musical note' icon. In addition, the icon may be a pictorial representation of a category associated with the search results. For instance, for search results found within the music database 232b, a 'musical note' icon may be displayed to indicate that particular search results are songs, a 'record' icon may be displayed to indicate that particular search results are album names, and a 'person' icon may be displayed to indicate that particular search results are artist names.

The display 210 may also be configured to display the search results in a particular order that is dependent on the application program represented by the highlighted icon and/or the database(s) in which the search results were found. More particularly, the search module 222 may provide the search results from the database(s) along with the desired ordering information to the processor 240, which may transfer the search results to the display 210 to be displayed in the order specified by the search module 222. For example, the display 210 may display search results from a contacts or phonebook database (not shown) in alphabetical order. In addition, the display 210 may display search results from the music database 232b in an order based on the artist that performs the songs and/or based on the corresponding album names for the songs. Also, for search results from multiple ones of the databases 232a-232c, the display 210 may be configured to display the search results in an order such that search results found in the same database are grouped together. For example, if a search string "Paris" is entered in the search field when the graphical icons corresponding to the messaging application 224 and the camera application 228 are highlighted, the display 210 may display a list of e-mails from the messages database 232a that include the string "Paris" prior to displaying a list of image files from the pictures database 232c that include "Paris" in the filename. Also, the search module 222 may be configured to prioritize querying of the databases responsive to receiving a user selection and/or specification indicating desired priorities associated with querying the databases via the user interface, for example, via a set-up menu for the search function. As such, the search module 222 may be configured to query the database(s) associated with the application program(s) represented by the highlighted icon(s) and/or display the search results based on user preferences.

Although FIG. 2 illustrates an exemplary hardware/software architecture that may be used in mobile terminals and/or other electronic devices for providing a search function with a search scope that is limited based on navigation of a menu screen, it will be understood that the present invention is not limited to such a configuration but is intended to encompass any configuration capable of carrying out operations described herein. For example, although described primarily with reference to a main or standby menu screen, it is to be understood that the menu screen displayed by the display 210 may include menu screens within particular applications, such as a menu screen within the music application 226 that may include 'artist' and/or 'genre' icons associated with sub-databases of the music database 232b. In addition, although the memory 230 is illustrated as separate from the processor 240, the memory 230 or portions thereof may be considered as a part of the processor 240. More generally, while particular functionalities are shown in particular blocks by way of illustration, functionalities of different blocks and/or portions thereof may be combined, divided, and/or eliminated. Moreover, the functionality of the hardware/software architecture of FIG. 2 may be implemented as a single processor system or a multi-processor system in accordance with various embodiments of the present invention.

Computer program code for carrying out operations of devices and/or systems discussed above with respect to FIG. 2 may be written in a high-level programming language, such as Java, C, and/or C++, for development convenience. In addition, computer program code for carrying out operations of embodiments of the present invention may also be written in other programming languages, such as, but not limited to interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, mobile terminals, electronic devices, data processing systems, and/or computer program products in accordance with some embodiments of the invention.

These flowchart and/or block diagrams further illustrate exemplary operations for providing search functionality that is limited based on navigation of a menu screen in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
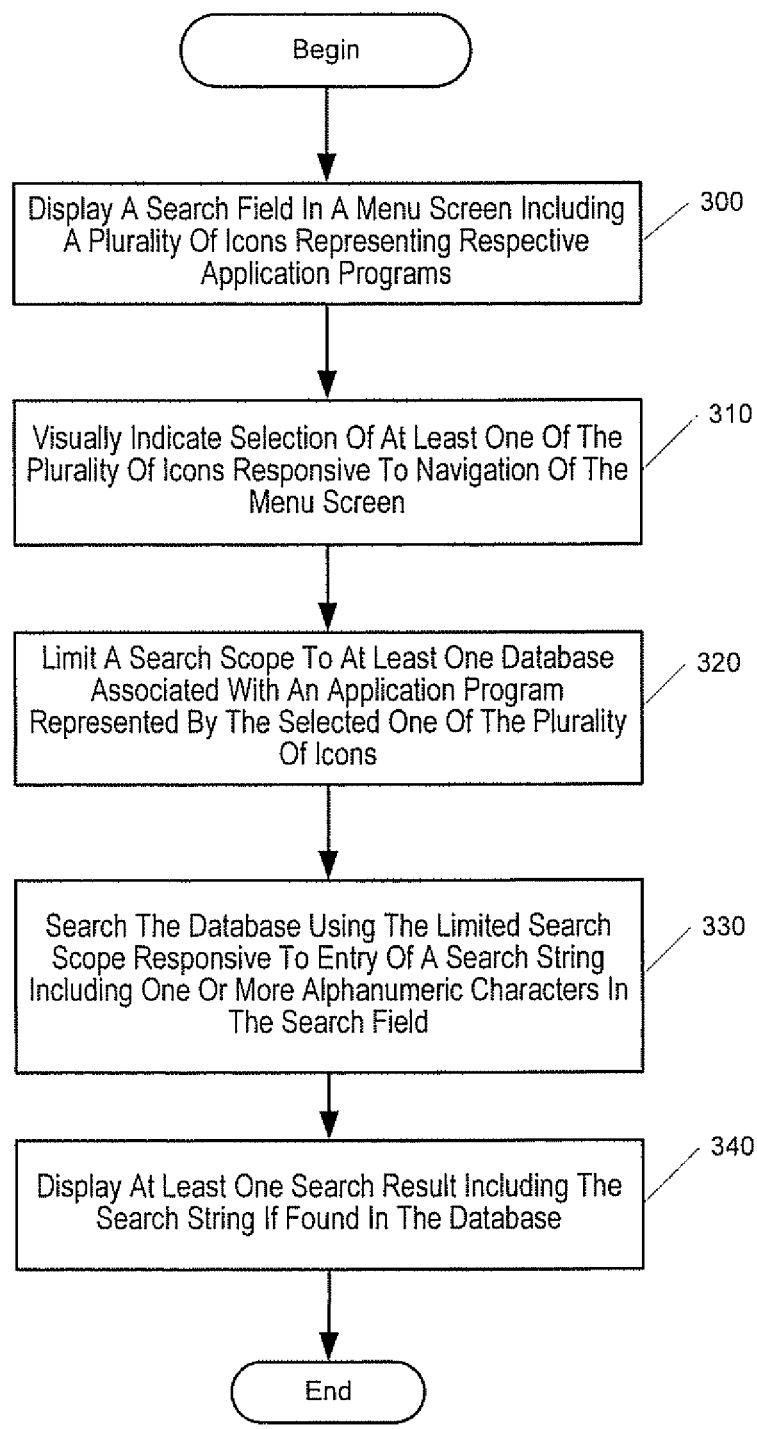
FIG. 3 is a flowchart illustrating example operations for limiting search scope based on navigation a menu screen in accordance with some embodiments of the present invention.

FIG. 3 is a flowchart that illustrates exemplary operations for limiting search scope based on navigation of a menu screen in accordance with some embodiments of the present invention.

Referring now to FIG. 3, a search field is displayed in a menu screen on a display of electronic device (block 300). The menu screen includes a plurality of icons representing respective application programs that can be accessed via the menu screen. For example, the menu screen may be a main menu and/or a standby menu screen in a mobile phone. The search field may be displayed in the menu screen responsive to a user input, or alternatively, may be permanently displayed as part of the menu screen, for example, in a lower or upper portion of the menu screen so as not to interfere with the displayed graphical icons. Selection of at least one of the icons is visually indicated responsive to navigation of the menu screen (block 310). For instance, in a mobile phone, a cursor may be moved using navigation keys to highlight one or more of the graphical icons displayed on the menu screen.

In some embodiments, the search field may be displayed in the menu screen after one or more of the graphical icons are highlighted.

Still referring to FIG. 3, a search scope is limited to at least one database associated with an application program represented by the selected one of the icons (block 320), and the database(s) are searched using the limited search scope responsive to entry of a search string in the search field (block 330). The search string may include one or more alphanumeric characters that define words, names, numbers, and/or portions thereof that may be associated with desired data. For example, responsive to the entry of the search string "Joa" in the search field when a 'contacts' icon is highlighted in a main menu screen of a mobile phone, the scope of the search for data including the characters "Joa" may be limited to a contacts database associated with a contacts application program represented by the highlighted 'contacts' icon. The limited search scope may also include sub-databases that are accessible by the database associated with the application program represented by the highlighted icon. As such, the database may be searched prior to executing the application program.

If matching data is found in the database associated with the application represented by the selected icon, at least one search result including the search string is displayed (block 340). For instance, in the above example, the search results "Joan" and "Joaquin" may be returned and displayed based on search of the contacts database. In some embodiments, the search result(s) may be displayed in the menu screen itself (i.e., prior to executing the application associated with the highlighted icon). Alternately, the search result(s) may be displayed in a subsequent screen associated with the application program (i.e., after executing the application program represented by the highlighted icon). The search results may also be displayed adjacent to icons respectively representing the database(s) in which the search results were found and/or in an order based on the databases in which the search results were found. For example, search results from a music database may be ordered based on artist or album title (rather than song title), while search results from a contacts database may be ordered alphabetically. Also, search results from the contacts database may be grouped together and displayed with a higher priority than search results from the music database, for example, based on user-definable preference settings. Accordingly, navigation of a graphical menu may be used in conjunction with a search function to limit or narrow a scope of the search, and thus, may limit the search results in a natural and intuitive manner.

The flowchart of FIG. 3 illustrates the architecture, functionality, and operations of embodiments of hardware and/or software in electronic devices, such as mobile terminals, according to some embodiments of the present invention. In this regard, each block represents a module, segment, or portion of code, which comprises one or more executable instructions for implementing the specified logical function(s). It should also be noted that in other implementations, the function(s) noted in the blocks may occur out of the order noted in FIG. 3. For example, two blocks shown in succession may, in fact, be executed substantially concurrently or the blocks may sometimes be executed in the reverse order, depending on the functionality involved.

FIGS. 4A-C are example screenshots illustrating operations for limiting search scope based on navigation of a main menu screen in a mobile terminal in accordance with some embodiments of the present invention. Referring to FIG. 4A, a main menu screen 400 includes a plurality of graphical icons 410-421. More particularly, the main menu screen 400 includes an 'envelope' icon 410 representing a messaging application, a 'globe' icon 411 representing an Internet application, a 'game pad' icon 412 representing one or more game applications, a 'musical note' icon 413 representing a music application, a 'phonebook' icon 414 representing a phonebook application, a 'wrench' icon 415 representing a tool/settings application, a 'calendar' icon 416 representing a calendar application, a 'phone' icon 417 representing a call history application, a 'folder' icon 418 representing a file management application, a 'camera' icon 419 representing a camera application, a 'playback' icon 420 representing an online music store application, and an 'address book' icon 421 representing a contacts application. The main menu screen 400 further includes an 'action' softkey 560 that may be used to execute application programs associated with the icons 410-421. The main menu screen 400 also includes a search field 430 displayed along a bottom portion thereof.

Referring to FIG. 4B, the envelope icon 410 is highlighted responsive to user navigation of the main menu screen 400, as indicated by cursor 440. For example, a user of the mobile terminal may navigate the main menu screen 400 by moving the cursor 440 using the mobile terminal's keypad and/or navigation keys to highlight different ones of the application program icons 410-421. The name 405 of the application program (i.e., "Messages") associated with the highlighted envelope icon 410 is also displayed at an upper portion of the main menu screen 400. In addition, a search string 432 (i.e., "Fish") is entered in the search field 430. Because the envelope icon 410 is highlighted by the cursor 440, a scope of the search for the entered search string "Fish" 432 is limited to one or more databases associated with the messaging application represented by the highlighted envelope icon 410. Thus, using the limited search scope, a messages database (such as the messages database 232a of FIG. 2) is queried to identify data that includes the search string "Fish" 432. However, it is to be understood that sub-databases that are accessible by the messages database, such as e-mail and/or text message databases, may also be included in the limited search scope. Thus, the e-mail and text messages sub-databases may also be searched for the search string 432 responsive to highlighting the envelope icon 410 with the cursor 440.

Referring to FIG. 4C, a list of search results 450 including the search string 432 is displayed in the main menu screen 400. More particularly, 43 search results (or "hits") 450 that include the search string "Fish" 432 are found in the messages database and are displayed in the main menu screen 400. The search results 450 are displayed in a window 455 that overlaps a portion of the main menu screen 400. As such, the messages database associated with the messaging application represented by the envelope icon 410 may be searched prior to and/or without executing the messages application. As shown in FIG. 4C, the search results 450 are displayed alphabetically by last name. However, the order in which the search results 450 are displayed may be altered to suit a user's preferences, for example, by selecting the wrench icon 415 (which represents a settings application) with the cursor 440. Also, the 'action' soft key 460 is updated to provide a function associated with the application program represented by the highlighted icon 410. More particularly, the 'action' soft key 460 is changed to provide a 'view' function associated with the messaging application. Accordingly, responsive to selection of the action soft key 460, the messaging application may be executed, and the selected one(s) of the search results 450 may be viewed using the messaging application.

FIGS. 5A-5B are example screenshots illustrating operations for limiting search scope based on navigation of a main menu screen in a mobile terminal in accordance with other embodiments of the present invention. Referring to FIG. 5A, a search string "Black" 532 is entered in the search field 430 via the user interface of the mobile terminal. In addition, the musical note icon 413 is highlighted responsive to user navigation of the main menu screen 400 with the cursor 540. The name "Music" 505 of the application program associated with the highlighted musical note icon 413 is also displayed in an upper portion of the main menu screen 400. As the musical note icon 413 is highlighted by the cursor 540, a scope of the search for the entered search string "Black" 532 is limited to one or more databases associated with the music application represented by the musical note icon 413. Accordingly, a music database (such as the music database 232b of FIG. 2) is queried to identify data that includes the search string "Black" 532.

Referring to FIG. 5B, a list of search results 550 including the search string 532 is displayed in the main menu screen 400. More particularly, 43 hits 550 that include the search string "Black" 532 are found in the music database and displayed in a window 555 overlapping a portion of the main menu screen 400. In addition, icons 570a-570c representing the database in which the search results 550 were found are displayed along with the search results 550. As shown in FIG. 5B, the icons 570a-570c are pictorial representations of the categories associated with the search results 550. More particularly, the 'musical note' icon 570a indicates that the adjacent search result is a song name. Likewise, the 'record' icon 570b indicates that the adjacent search results are album names, and the 'person' icon 570c indicates that the adjacent search results are artist names. Also, the 'action' soft key 560 is updated to provide a 'play' function associated with the music application program represented by the highlighted musical notes icon 413. Thus, responsive to selection of the action soft key 560, the music application may be launched, and the selected one(s) of the search results 550 may be played back by the music application.

Figure 6B:
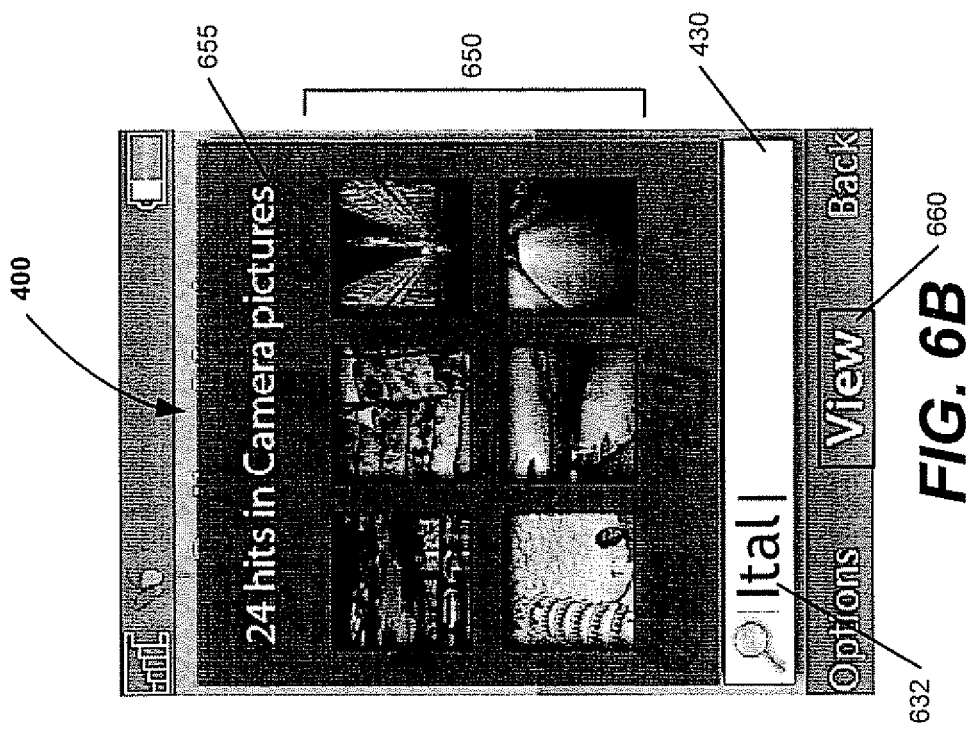
FIGS. 6A-6B are example screenshots illustrating operations for limiting search scope based on navigation of a main menu screen in a mobile terminal in accordance with further embodiments of the present invention.
Figure 6A:
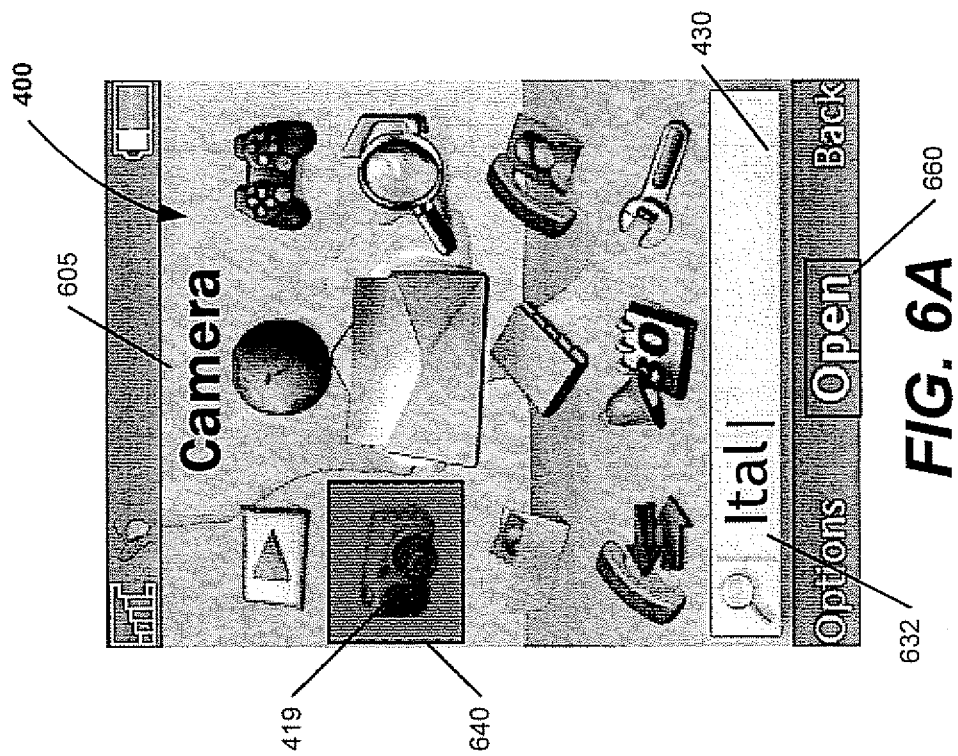

FIGS. 6A-6B are example screenshots illustrating operations for limiting search scope based on navigation of a main menu screen in a mobile terminal in accordance with further embodiments of the present invention. Referring to FIG. 6A, the camera icon 419 is highlighted responsive to user navigation of the main menu screen 400 using the cursor 640. The name "Camera" 605 of the application program associated with the highlighted camera icon 419 is also displayed at the upper portion of the main menu screen 400. In addition, a search string "Ital" 632 is entered in the search field 430. Since the camera icon 419 is highlighted by the cursor 640, a scope of the search for the entered search string "Ital" 632 is limited to one or more databases associated with the camera application represented by the camera icon 419. As such, a pictures database (such as the pictures database 232c of FIG. 2) is queried to identify data that includes the search string "Ital" 632.

Referring to FIG. 6B, a list of search results is 650 including the search string 632 is displayed in the main menu screen 400. More particularly, 24 hits 650 that include the search string "Ital" 632 are found in the pictures database, and are displayed in a window 655 overlapping at least a portion of the main menu screen 400. The search results 650 are displayed as thumbnail representations of corresponding image files that include the search string "Ital" in their respective filenames. The search results 650 are also displayed in alphabetical order based on the file names of the image files. In addition, the 'action' soft key 660 is updated to provide a 'view' function associated with the camera application program represented by the highlighted camera icon 419. Thus, responsive to selection of the action soft key 660, the camera application may be launched, and one or more of the search results 650 may be viewed using the camera application.

Accordingly, some embodiments of the present invention may provide improved search functionality by narrowing a scope of a search based on navigation of a menu screen. More particularly, in some embodiments, a search field may be displayed in a menu screen of electronic device, and the search scope may be limited to one or more databases associated with an application program that is represented by a highlighted or otherwise visually selected icon in the menu screen. Thus, a search can be performed from the menu without entering a specific application program, and search results may be limited in a natural and intuitive manner.

In the drawings and specification, there have been disclosed exemplary embodiments of the invention. However, many variations and modifications can be made to these embodiments without substantially departing from the principles of the present invention. Accordingly, although specific terms are used, they are used in a generic and descriptive sense only and not for purposes of limitation, the scope of the invention being defined by the following claims.

That which is claimed:

1. A method of operating an electronic device, the method comprising:
   displaying a search field in a menu screen including a plurality of icons representing and operable to launch respective application programs responsive to selection thereof;
   visually indicating one of the plurality of icons as an active icon responsive to navigation of the menu screen;
   limiting a search scope to at least one database of a plurality of databases in response to visually indicating the one of the plurality of icons as the active icon, wherein the at least one database is associated with an application program represented by the active icon;
   searching the at least one database using the limited search scope responsive to entry of a search string including one or more alphanumeric characters in the search field, wherein searching at least one database using the limited search scope comprises searching at least one sub-database accessible by the database and associated with the application program represented by the active icon; and
   displaying at least one search result including the search string found in the at least one database, wherein displaying at least one search result comprises displaying a plurality of search results including the search string in an order that is based on the at least one database in which the plurality of search results were found and/or the application program represented by the active icon.

2. The method of claim 1, wherein searching the at least one database using the limited search scope comprises:
   searching the at least one database prior to executing the application program represented by the active icon.

3. The method of claim 1, wherein the menu screen comprises a main menu and/or a standby menu screen of a mobile terminal, wherein the main menu and/or standby menu screen is used to select the one of the plurality of icons for execution of the respective application program represented thereby.

4. The method of claim 1, wherein displaying at least one search result comprises:
   displaying the search result in the menu screen.

5. The method of claim 1, wherein displaying at least one search result comprises:
   displaying the search result after executing the application program represented by the active icon.

6. The method of claim 1, wherein displaying at least one search result comprises:

displaying the search result and an icon associated with the database in which the search result was found.

7. The method of claim 6, wherein the icon comprises a pictorial representation of a functionality of the application program associated with the database.

8. The method of claim 6, wherein the icon further comprises a pictorial representation of a category associated with the search result.

9. The method of claim 1, wherein displaying at least one search result comprises:
displaying a plurality of search results including the search string in an order such that ones of the plurality of search results found in a same one of the plurality of databases are grouped together.

10. The method of claim 1, wherein visually indicating the one of the plurality of icons as the active icon comprises highlighting the one of the plurality of icons.

11. An electronic device, comprising:
a user interface configured to provide navigation of a menu screen;
a memory configured to store application programs and databases associated therewith;
a display configured to display a search field in the menu screen including a plurality of icons representing and operable to launch the respective application programs responsive to selection thereof, and configured to visually indicate one of the plurality of icons as an active icon responsive to navigation of the menu screen via the user interface; and
a search module configured to limit a search scope to at least one database of a plurality of databases in response to visual indication of the one of the plurality of icons as the active icon, wherein the at least one database is associated with an application program represented by the active icon and configured to search the at least one database using the limited search scope responsive to entry of a search string including one or more alphanumeric characters in the search field, wherein the search module is configured to search at least one sub-database accessible by the database and associated with the application program represented by the active icon using the limited search scope,
wherein the display is further configured to display at least one search result including the search string found in the at least one database, wherein displaying at least one search result comprises displaying a plurality of search results including the search string in an order that is based on the at least one database in which the plurality of search results were found and/or the application program represented by the active icon.

12. The device of claim 11, further comprising:
a processor configured to execute the application program represented by the active icon,
wherein the search module is configured to search the at least one database prior to execution of the application program by the processor.

13. The device of claim 11, wherein the menu screen comprises a main menu and/or a standby menu screen of a mobile terminal, wherein the main menu and/or standby menu screen is used to select the one of the plurality of icons for execution of the respective application program represented thereby.

14. The device of claim 11, wherein the display is configured to display the search result in the menu screen.

15. The device of claim 11, wherein the display is configured to display the search result after execution of the application program represented by the active icon.

16. The device of claim 11, wherein the display is configured to display the search result and an icon associated with the database in which the search result was found.

17. The device of claim 16, wherein the icon comprises a pictorial representation of a category associated with the search result.

18. The device of claim 11, wherein the display is configured to visually indicate the one of the plurality of icons as the active icon by highlighting the one of the plurality of icons.

19. A computer program product providing a search function in a mobile terminal, the computer program product comprising:
a non-transitory computer readable storage medium having computer readable program code embodied in said medium, said computer readable program code comprising:
computer readable program code that displays a search field in a menu screen including a plurality of icons representing and operable to launch respective application programs responsive to selection thereof;
computer readable program code that visually indicates one of the plurality of icons as an active icon responsive to navigation of the menu screen;
computer readable program code that limits a search scope to at least one database of a plurality of databases in response to visual indication of the one of the plurality of icons as the active icon, wherein the at least one database is associated with an application program represented by the active icon;
computer readable program code that searches the at least one database using the limited search scope responsive to entry of a search string including one or more alphanumeric characters in the search field, wherein searching at least one database using the limited search scope comprises searching at least one sub-database accessible by the database and associated with the application program represented by the active icon; and
computer readable program code that displays at least one search result including the search string found in the at least one database, wherein displaying at least one search result comprises displaying a plurality of search results including the search string in an order that is based on the at least one database in which the plurality of search results were found and/or the application program represented by the active icon.

20. The computer program product of claim 19, wherein the computer readable program code that visually indicates the one of the plurality of icons as the active icon comprises computer readable program code that highlights the one of the plurality of icons.

* * * * *